US012116961B1

(12) United States Patent
Luehrsen et al.

(10) Patent No.: US 12,116,961 B1
(45) Date of Patent: Oct. 15, 2024

(54) METHODS AND SYSTEMS FOR EGR SYSTEM

(71) Applicant: Ford Global Technologies, LLC, Dearborn, MI (US)

(72) Inventors: Eric Luehrsen, Dearborn, MI (US); Sumanth Reddy Dadam, New Hudson, MI (US); Edward Doemer, Dearborn Heights, MI (US); Gladys Galicia, Shelby Township, MI (US); Adam Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/364,795

(22) Filed: Aug. 3, 2023

(51) Int. Cl.

| | |
|---|---|
| ***F02M 26/49*** | (2016.01) |
| ***F02D 41/00*** | (2006.01) |
| ***F02M 26/22*** | (2016.01) |
| ***F02M 26/47*** | (2016.01) |
| ***F02P 5/15*** | (2006.01) |

(52) U.S. Cl.
CPC ......... *F02M 26/49* (2016.02); *F02D 41/0007* (2013.01); *F02D 41/0047* (2013.01); *F02M 26/22* (2016.02); *F02M 26/47* (2016.02); *F02P 5/1516* (2013.01)

(58) Field of Classification Search
CPC .. F02D 41/0047; F02D 41/0007; F02D 26/47; F02D 26/22
See application file for complete search history.

(56) References Cited

U.S. PATENT DOCUMENTS

| | | | | |
|---|---|---|---|---|
| 6,763,708 | B2 | 7/2004 | Ting et al. | |
| 6,804,601 | B2 | 10/2004 | Wang et al. | |
| 9,267,453 | B2 * | 2/2016 | Surnilla | F02M 26/48 |
| 2015/0101327 | A1 * | 4/2015 | Clark | F02D 41/144 60/599 |
| 2021/0148298 | A1 * | 5/2021 | Oh | F02M 26/21 |

FOREIGN PATENT DOCUMENTS

| | | | |
|---|---|---|---|
| JP | 2013144961 | A | 7/2013 |

* cited by examiner

*Primary Examiner* — Kevin A Lathers
(74) *Attorney, Agent, or Firm* — Vincent Mastrogiacomo; McCoy Russell LLP

(57) ABSTRACT

Methods and systems are provided for an exhaust gas recirculation (EGR) system. In one example, a method includes determining a present EGR valve offset and an historical EGR valve offset and comparing the present EGR valve offset and the historical EGR valve offset to determine a presence of an EGR leak.

20 Claims, 8 Drawing Sheets

METHODS AND SYSTEMS FOR EGR SYSTEM

FIELD

The present description relates generally to diagnostic routines for an EGR system of a vehicle.

BACKGROUND/SUMMARY

Engine systems may utilize recirculation of exhaust gas from an engine exhaust system to an engine intake system, a process referred to as exhaust gas recirculation (EGR), to reduce emissions. An EGR valve may be controlled to achieve a desired intake air dilution for a given engine operating condition. Traditionally, the amount of low pressure EGR (LP-EGR) and/or high pressure EGR (HP-EGR) routed through the EGR system may be measured and adjusted based on engine speed, engine temperature, and load during engine operation to maintain desirable combustion stability of the engine while providing emissions and fuel economy benefits. EGR effectively cools combustion chamber temperatures thereby reducing NOx formation.

In some existing implementations of EGR systems, EGR delivery may be measured via a fixed orifice and a pressure drop sensed across the orifice. The orifice pressure drop may be measured by a differential pressure sensor or two discrete pressure sensors, one of each side of the orifice. An orifice EGR flow measurement may be possible via characterizing a relationship between flow and the orifice pressure drop. The relationship may be stored in memory and retrieved during future EGR flow conditions to adjust EGR measured flow rate. The EGR measured flow rate can then be used by a controller to include adjust an engine airflow, an in-cylinder fuel/air mixture burn rate, an engine output torque, and as a feedback signal in a closed loop EGR flow controller configuration, in which EGR flow is modulated by a valve separate from the fixed orifice.

Other examples of EGR systems include measuring the EGR flow delivered by measuring or estimating a pressure drop across an EGR control valve. The EGR control valve measurement may characterize a relationship between flow and the orifice pressure drop. The value may be stored and used to adjust conditions similar to those described above. EGR flow measurements in either of these configurations may be dependent on the accuracy of the pressure sensors and or a position sensor of the EGR valve. While diagnostics for the pressure sensors exist, diagnostics for the position sensor remain desired. Furthermore, since a duty cycle of the EGR valve may be based on feedback from the position sensor, recalibrations of the position sensor may be desired based on the diagnostic.

In one example, the issues described above may be addressed by a method for operating an exhaust gas recirculation (EGR) system including applying a cooler pressure model to compute a cooler pressure drop as a function of engine operating parameters with EGR flow, and diagnosing an EGR pressure (EGRP) sensor based on a comparison of an EGRP sensor reading to a manifold air pressure (MAP) sensor reading and the cooler pressure drop. In this way, diagnostic of a hot side EGRP sensor may be executed.

As one example, the EGR system may include multiple diagnostic routines for determining a condition of the EGRP sensor. The routines may be executed separately, or in tandem, to verify the condition of the EGRP sensor. By doing this, EGR mass flow to an engine may be equal to a demanded amount, which may increase engine performance and reduce emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
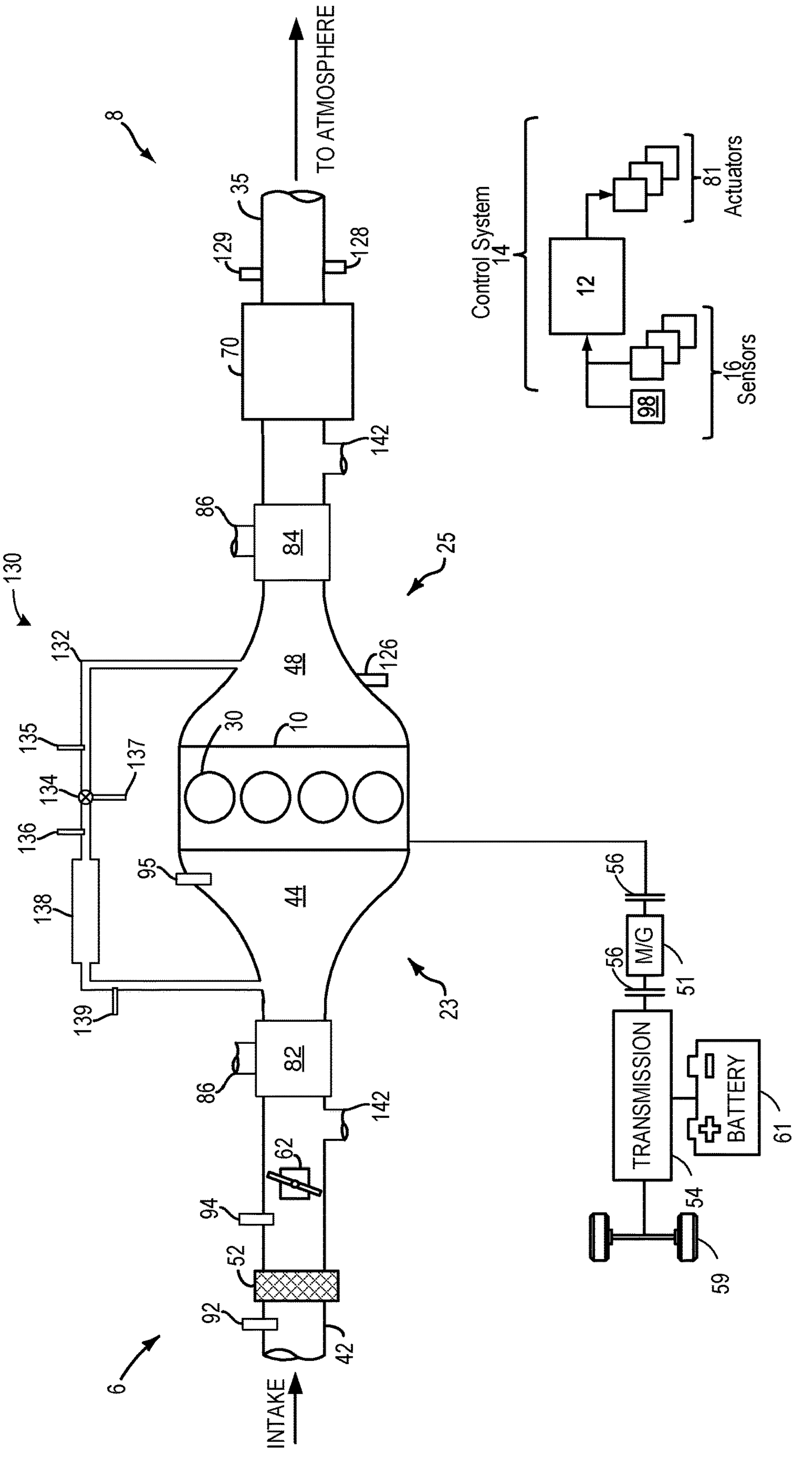
FIG. 1 illustrates a schematic of an engine included in a hybrid vehicle.
Figure 6:
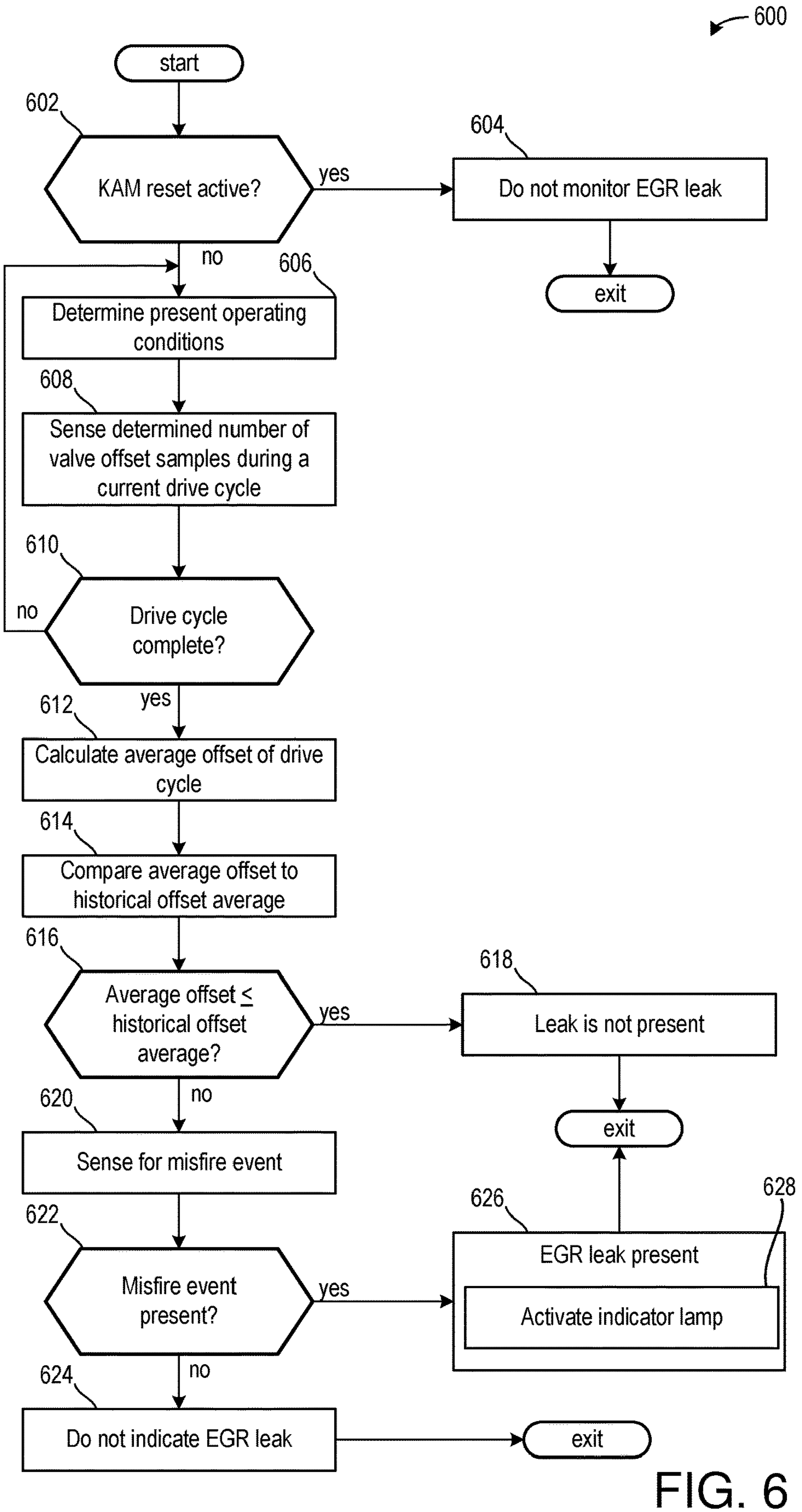
FIG. 6 illustrates a method for determining if an EGR valve offset is occurring with a misfire, according to an embodiment of the present disclosure.
Figure 7:
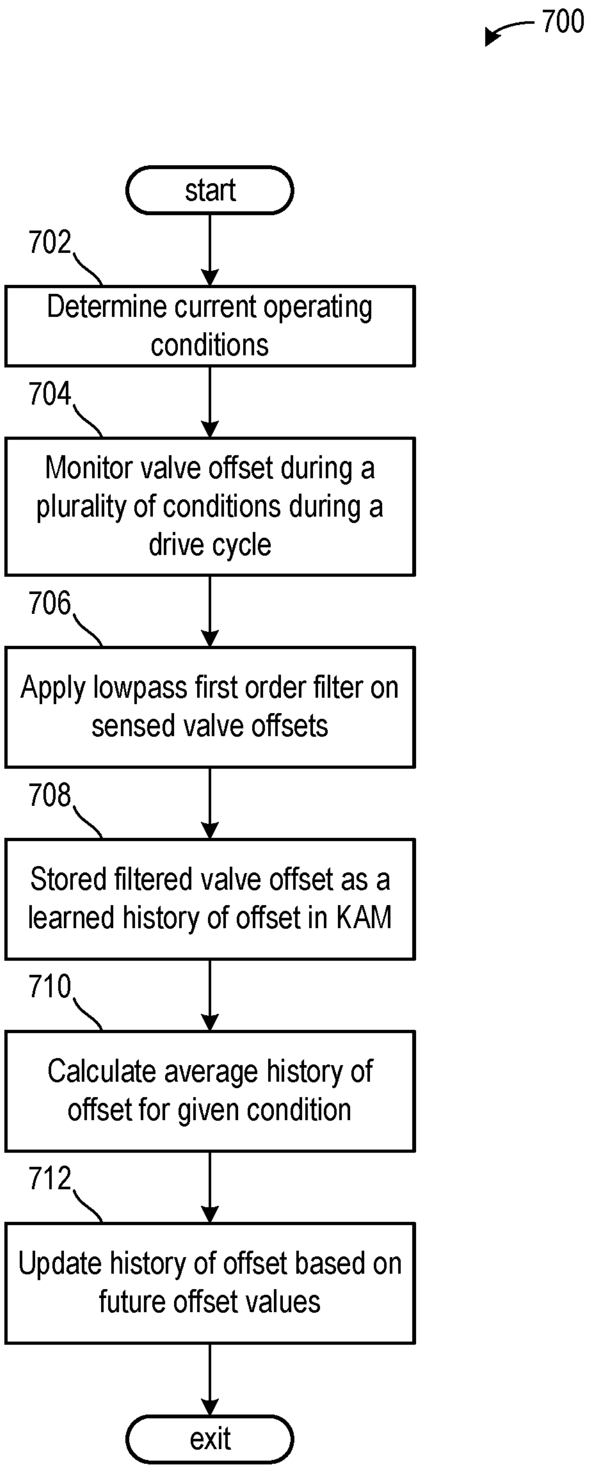
FIG. 7 illustrates a method for determining an historical EGR valve offset, according to an embodiment of the present disclosure.
Figure 8:
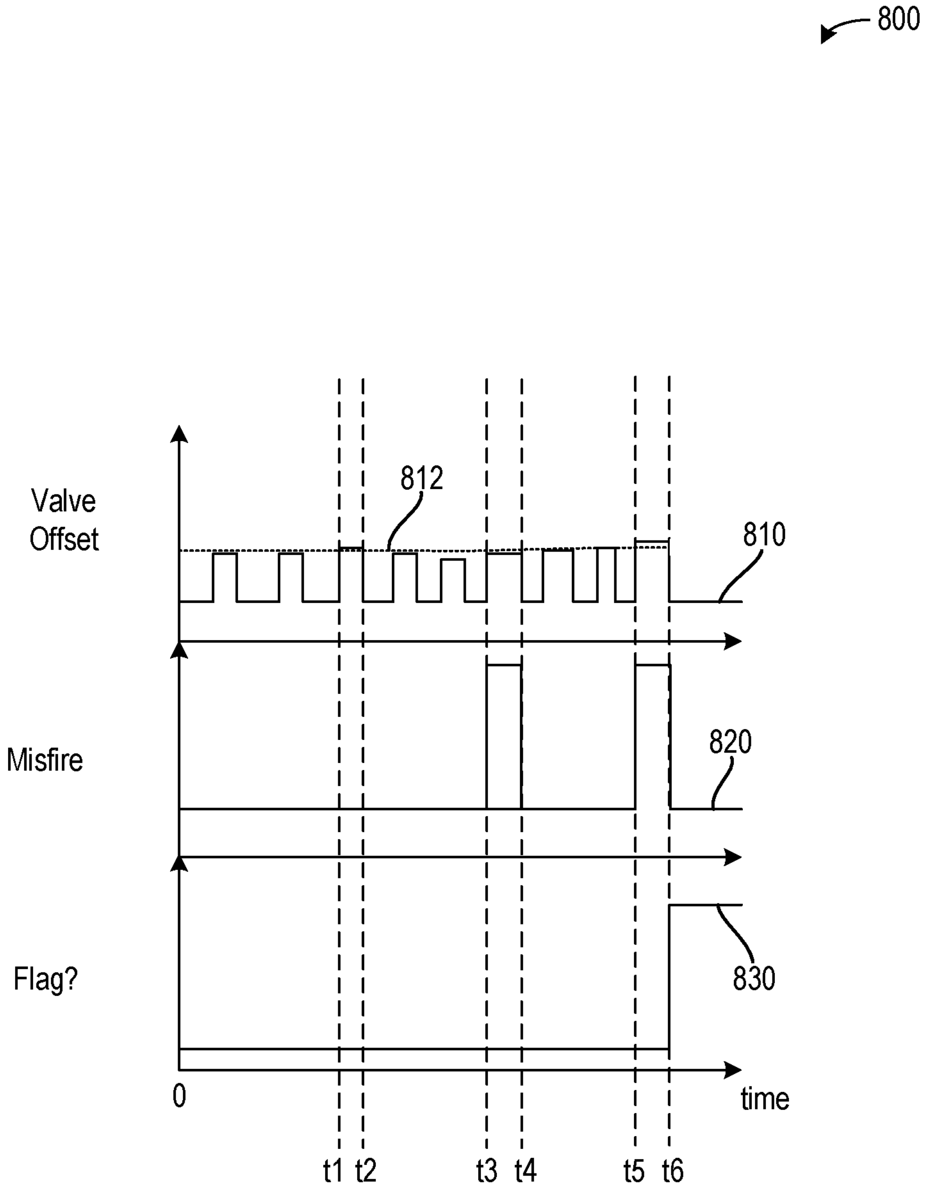
FIG. 8 illustrates an engine operating sequence for comparing the EGR valve offset to the historical offset and determining if maintenance is desired, according to an embodiment of the present disclosure.

The following description relates to systems and methods for an exhaust gas recirculation (EGR) system. In one example, the EGR system is configured to direct exhaust gas back to an engine, as shown in FIG. 1. The EGR system may include a valve and one or more sensors for dosing EGR flow to a determined amount based on operating conditions. Routines for diagnosing conditions of the one or more sensors are shown in FIGS. 2-5. Routines for determining an offset of the valve of the EGR system are shown in FIGS. 6-7. FIG. 8 shows an operating sequence graphically illustrating a current valve offset being compared to an historical EGR valve offset, and determining if the EGR valve offset is leading to an undesired amount of EGR leakage.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. The engine intake manifold 44 may further comprise a manifold absolute pressure (MAP) sensor 95. Engine exhaust 25 includes an exhaust manifold 48 leading to an exhaust passage 35 that routes exhaust gas to the atmosphere. Engine exhaust 25 may include at least one emission control device 70 mounted in a close-coupled position or in a far underbody position. The emission control device 70 may include a three-way catalyst, lean NOx trap, particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

In the example of the present disclosure, the emission control device 70 is a particulate filter 70. In one example, the particulate filter 70 is a gasoline particulate filter. In another example, the particulate filter 70 is a diesel particulate filter.

The engine system 8 further comprises a turbocharger having a compressor 82 and a turbine 84. The compressor 82 and the turbine 84 are mechanically coupled via a shaft 86. The turbine 84 may be driven via exhaust gases flowing through the exhaust passage 35. The exhaust gases may rotate a rotor of the turbine 84, which may rotate the shaft 86, resulting in rotation of a rotor of the compressor 82. The compressor 82 is configured to receive and compress intake air.

The engine system 8 further comprises an exhaust-gas recirculation (EGR) system 130. In the example of FIG. 1, the EGR system 130 is a high-pressure EGR system where exhaust gases are drawn from a location of the engine exhaust 25 upstream of the turbine 84. The EGR system 130 comprises an EGR valve 134 arranged upstream of a heat exchanger 138, relative to a direction of exhaust gas flow in an EGR passage 132.

The EGR system 130 further comprises a first pressure sensor 135, herein, referred to as an exhaust pressure (EXP) sensor 135, a second pressure sensor 136, herein, referred to as an EGR pressure (EGRP) sensor 136, and a temperature sensor 139. The EXP sensor 135 may be arranged upstream of the EGR valve 134 and the EGRP sensor 136 may be arranged downstream of the EGR valve, relative to a direction of exhaust gas flow. The temperature sensor 139 may be arranged downstream of the heat exchanger 138. Each of the EXP sensor 135, the EGRP sensor 136, and the temperature sensor 139 may be configured to provide feedback to the controller 12. As illustrated, the EGR system 130 is a high-pressure EGR system free of a fixed orifice delta pressure sensor. In one example, the EGR system 130 is a delta pressure over valve (DPOV) EGR system 130, wherein the delta pressure is determined via feedback from the EXP sensor 135 and the EGRP sensor 136.

An EGR valve position sensor 137 may be configured to provide feedback to the controller 12 with regard to a position of the EGR valve 134. In some examples, an accuracy of the EGR valve position sensor 137 and/or the EGRP sensor 136 may degrade over time. This may result in EGR flow rates being different than a requested amount, which may reduce engine performance. Routines are included herein for diagnosing a condition of the EGRP sensor 136.

In one example, the heat exchanger 138 may be a liquid-to-liquid or an air-to-liquid cooler. The heat exchanger 138 may be configured to receive coolant from a cooling system of the hybrid vehicle 6, such as an engine cooling system or other similar cooling system. The heat exchanger 138 (herein, interchangeably referred to as a cooler) is arranged downstream of the EGRP sensor 136 relative to a direction of EGR flow. In one example, the EGR system 130 including the EGR valve 134 upstream of the heat exchanger 138 is a hot side EGR system configuration.

Additionally or alternatively, the heat exchanger 138 may comprise a cooling system separate from other cooling system of the hybrid vehicle 6. In some examples, a bypass passage may be included in the EGR system 130, wherein the bypass passage is configured to flow pressurized exhaust gases around the heat exchanger 138 during conditions where cooling may not be desired. In one example, cooling may not be desired during conditions where an engine temperature is less than a desired temperature, such as during a cold-start.

In the example of FIG. 1, the hybrid vehicle 6 further comprises a low-pressure (LP) EGR passage 142. The LP-EGR passage 142 is configured to divert exhaust gases from downstream of the turbine 84 to a portion of the intake passage 42 upstream of the compressor 82. Additionally or alternatively, in some examples, the hybrid vehicle 6 may be configured without the LP-EGR passage 142 without departing from the scope of the present disclosure.

Hybrid vehicle 6 may further include control system 14. Control system 14 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of the emission control device, a temperature sensor 128, and a pressure sensor 129. The sensors 16 may further include a barometric pressure (BP) sensor (e.g., a barometer) 98. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and the electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Figure 2:
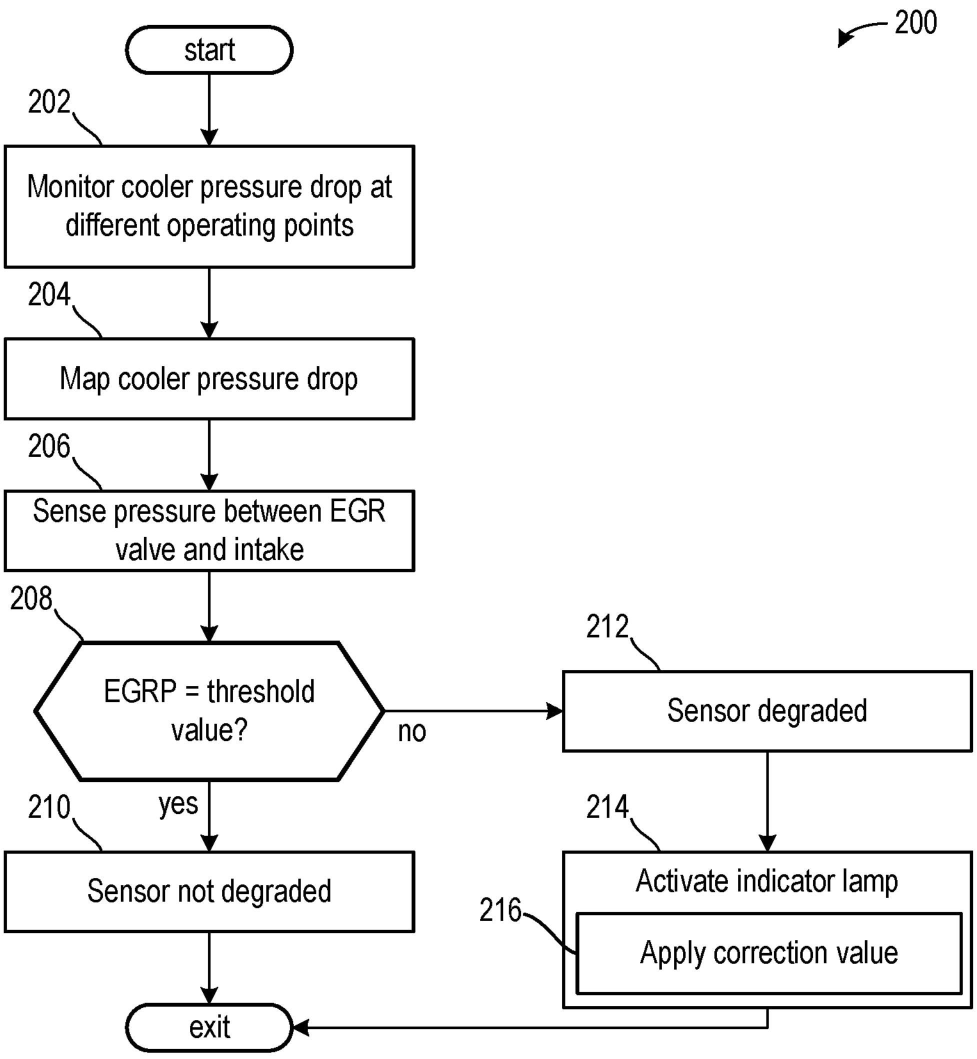
FIG. 2 illustrates a first routine for diagnosing an exhaust gas recirculation pressure (EGRP) sensor, according to an embodiment of the present disclosure.

Turning now to FIG. 2, it shows a method 200 for diagnosing an EGRP sensor of an EGR system via a first diagnostic routine. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

In one example, the method 200 and the rest of the methods included herein may be used in combination with the components illustrated in FIG. 1. For example, diagnosis of the EGRP 136 may be executed via the methods described herein. The diagnostics of the routines of the methods included herein may further include the other sensors and actuators of the EGR system and vehicle system of FIG. 1 including the MAP sensor 95, the EXP sensor 135, the temperature sensor 139, and the EGR valve 134.

The method 200 begins at 202, which includes monitoring a cooler pressure drop at different operating points. The cooler pressure drop (e.g., a pressure differential across the cooler) may be determined based feedback from a pressure sensor upstream of the cooler (e.g., the EGRP sensor) and a pressure sensor downstream of the cooler (e.g., the MAP sensor 95). Additionally or alternatively, the cooler pressure drop may be determined based on a coolant temperature in the cooler and a temperature of EGR exiting the cooler. Operating points at which the cooler pressure drop may include two or more of an idle load, a low load, a high load, a mid-load between the low and high loads, a vehicle rate of change of speed, a vehicle tow condition, a coasting event, and other similar operating parameters.

A cooler pressure model may be used to estimate the cooler pressure drop at the different operating points based on the empirically gathered data. The cooler pressure model may estimate cooler fouling over time based on the gathered data.

At 204, the method 200 may include mapping the cooler pressure drop. The cooler pressure drop may be stored in a multi-input look-up table in memory of the controller. Inputs may include the different operating points, wherein the output may include the cooler pressure drop.

At 206, the method 200 may include sensing a pressure between the EGR valve and the intake. In one example, the pressure may be sensed by the EGRP sensor located between the EGR valve and the cooler.

At 208, the method 200 may include determining if the EGRP sensor reading is equal to a threshold value. In one example, the threshold value is equal to a sum of the MAP and the cooler pressure drop. In some examples, additionally or alternatively, the EGRP sensor reading may be compared to a range based on the threshold value. For example, the range may be based on±5% of the threshold value. As discussed above, the cooler pressure drop is monitored at different operating points. As such, the threshold value is a dynamic value that changes based on a current operating point of the vehicle.

If the EGRP sensor reading is equal to the threshold value or within the range of the threshold value, then at 210, the method 200 may include determining the EGRP sensor is not degraded. As such, EGR flow estimates based on feedback from the EGRP sensor may be accurate, and EGRP sensor feedback may not be modified.

If the EGRP sensor is not equal to the threshold value or outside of the range of the threshold value, then at 212, the method 200 may include determining the EGRP sensor is degraded.

At 214, the method 200 may include activating an indicator.

At 216, the method 200 may include applying a correction value. The correction value may be applied to the EGRP sensor reading, which may provide a more accurate estimation of EGR flow.

In some examples, additionally or alternatively, if the EGRP sensor reading is outside of the range by a determine value (e.g., 10% outside of a lower or higher bound of the range), then activating the indicator lamp may further include requesting service to and/or replacement of the EGRP sensor.

Figure 3:
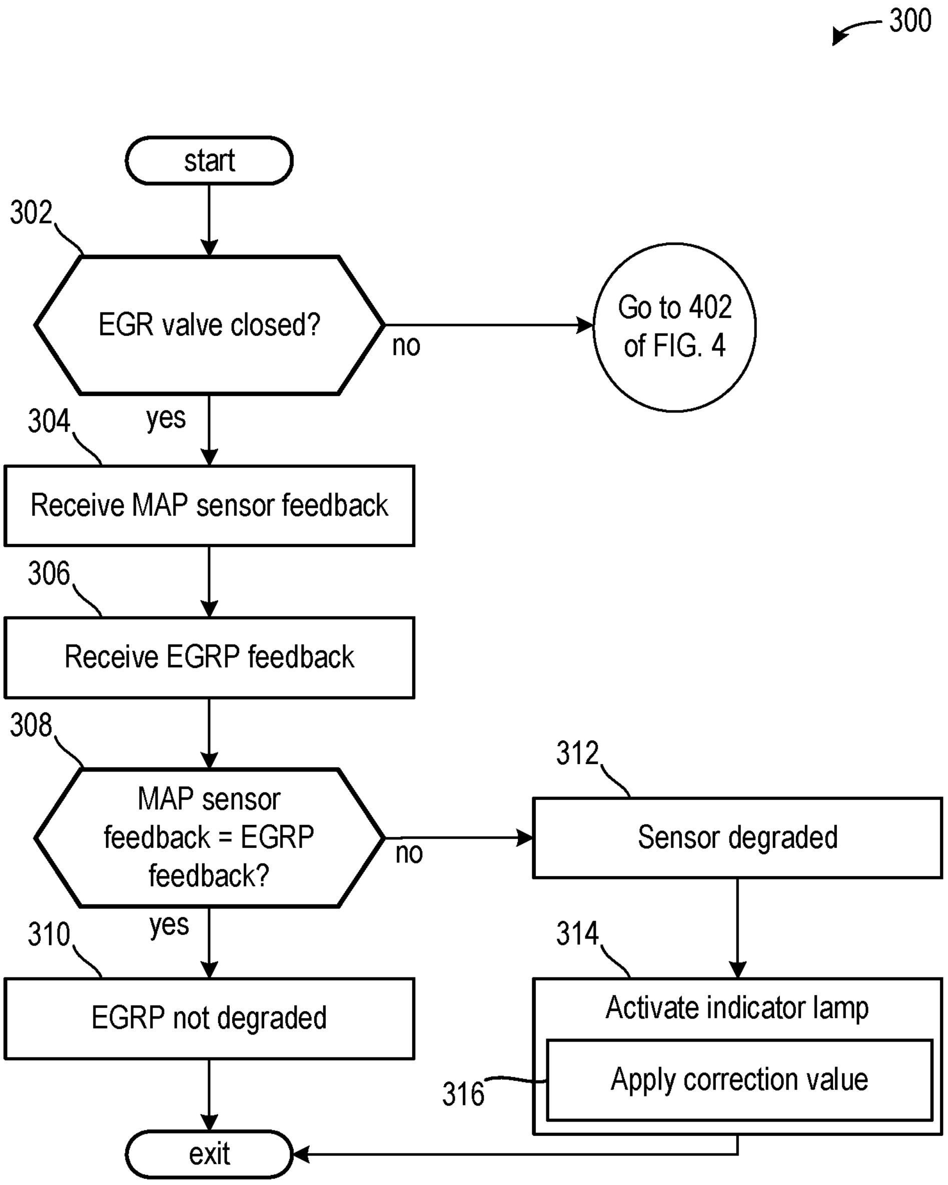
FIG. 3 illustrates a second routine for diagnosing an exhaust gas recirculation pressure (EGRP) sensor, according to an embodiment of the present disclosure.

Turning now to FIG. 3, it shows a method 300 for diagnosing the EGRP sensor when the EGR valve closed. At 302, the method 300 may include determining if the EGR valve is closed. The EGR valve may be determined to be closed based on feedback from the MAP sensor, the EGRP sensor, and the like. Additionally or alternatively, the EGR valve may be closed based on an engine operating condition, wherein EGR is not demanded during the engine operating condition.

Figure 4:
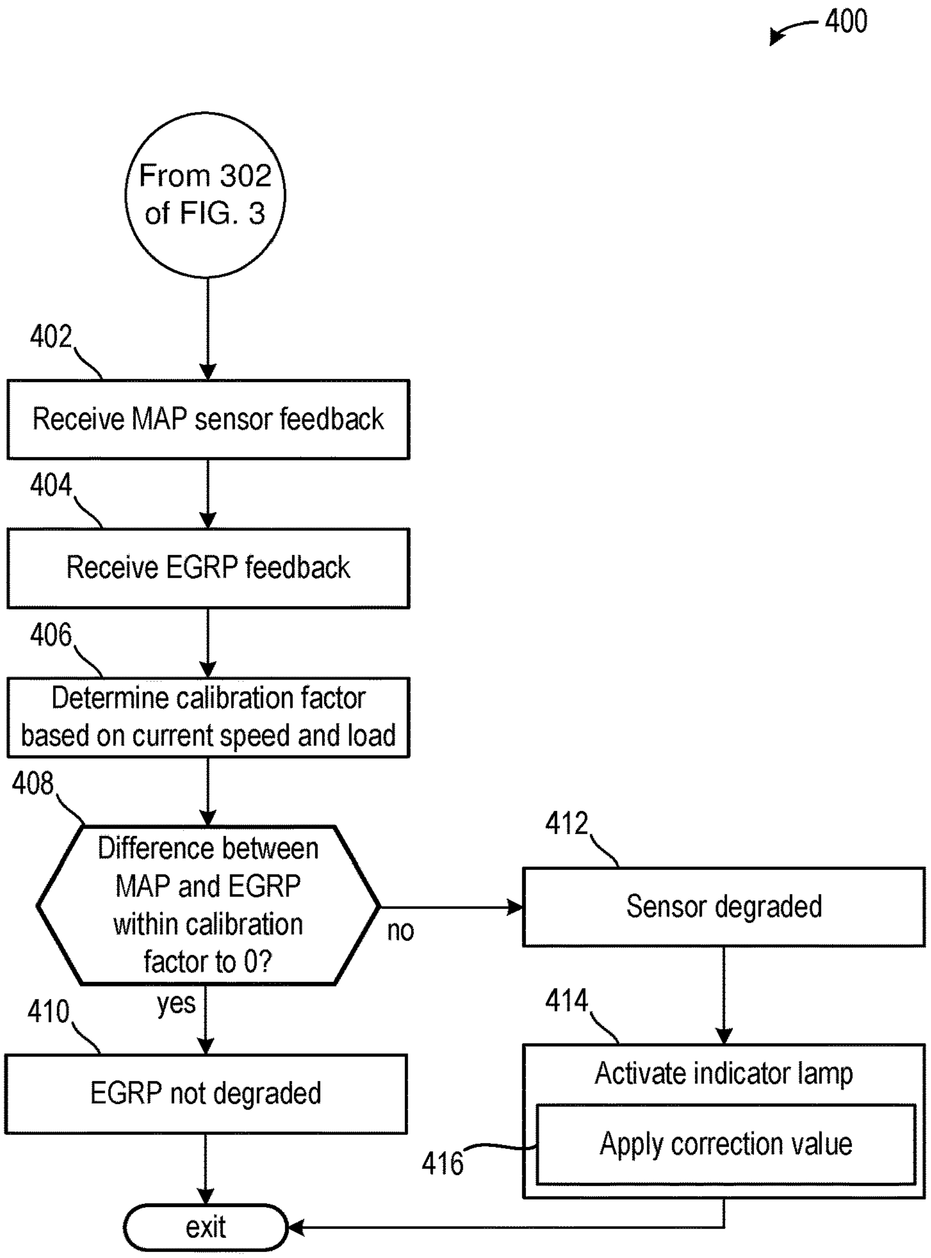
FIG. 4 illustrates a third routine for diagnosing an exhaust gas recirculation pressure (EGRP) sensor, according to an embodiment of the present disclosure.

If the EGR valve is not closed, then the diagnostic of method 400 of FIG. 4 may be executed.

If the EGR valve is closed, then at 304, the method 300 may include receiving MAP sensor feedback. The MAP sensor may provide an indication of a manifold pressure.

At 306, the method 300 may include receiving EGRP feedback.

At 308, the method 300 may include determining if the MAP sensor feedback is equal to the EGRP feedback. When the EGR valve is closed, the readings of the MAP sensor and the EGRP sensor may be equal.

Additionally or alternatively, the MAP sensor reading and the EGRP sensor reading may be compared to the mapped cooler pressure drop. For example, the cooler may be fouled or comprise a restriction therein that may affect the comparison between the MAP sensor reading and the EGRP sensor reading. As such, the cooler pressure model may be used during the diagnostic routine of method 300 in some embodiments.

If the MAP sensor feedback is equal to the EGRP sensor feedback, then at 310, the method 300 may include determining the EGRP sensor is not degraded. Adjustments to EGRP sensor feedback may not be initiated.

If the MAP sensor feedback is not equal to the EGRP sensor feedback, then at 312, the method 300 may include determining the EGRP sensor is degraded.

At 314, the method 300 may include activating an indicator.

At 316, the method 300 may include applying a correction value. The correction value may be applied to the EGRP sensor reading, which may provide a more accurate estimation of EGR flow.

Turning now to FIG. 4, it shows the method 400 for diagnosing the EGRP sensor when the EGR valve is open and EGR is flowing to the engine. The method 400 begins at 402 following a NO at 302 of method 300 of FIG. 3. At 402, the method 400 may include receiving MAP sensor feedback.

At 404, the method 400 may include receiving EGRP sensor feedback.

At 406, the method 400 may include determining a calibration factor based on current speed and load. In one example, the EGRP sensor and MAP sensor readings track one another along a quadratic. However, at certain speeds and loads, the EGRP sensor reading may drift from the quadratic and the MAP sensor reading. The calibration factor may account for the drift such that a sum of the calibration factor and the MAP sensor is equal to the EGRP sensor reading when the EGRP sensor is not degraded. In one example, the calibration factor is equal to or based on the cooler pressure drop. Additionally or alternatively, the calibration factor may be empirically determined based on monitored EGRP sensor reading drifts from MAP sensor readings during different engine speeds and loads.

At 408, the method 400 may include determining if a difference between MAP and EGRP readings are within the calibration factor to zero. Said another way, the difference between the MAP and EGRP readings are compared to zero±the calibration factor.

If the difference is equal to zero or within the calibration factor to zero, then at 410, the method 400 may include determining the EGRP sensor is not degraded. Adjustments to EGRP sensor feedback may not be initiated.

If the difference is not within the calibration factor to zero, then at 412, the method 400 may include determining the EGRP sensor is degraded.

At 414, the method 400 may include activating an indicator.

At 416, the method 400 may include applying a correction value. The correction value may be applied to the EGRP sensor reading, which may provide a more accurate estimation of EGR flow.

Figure 5:
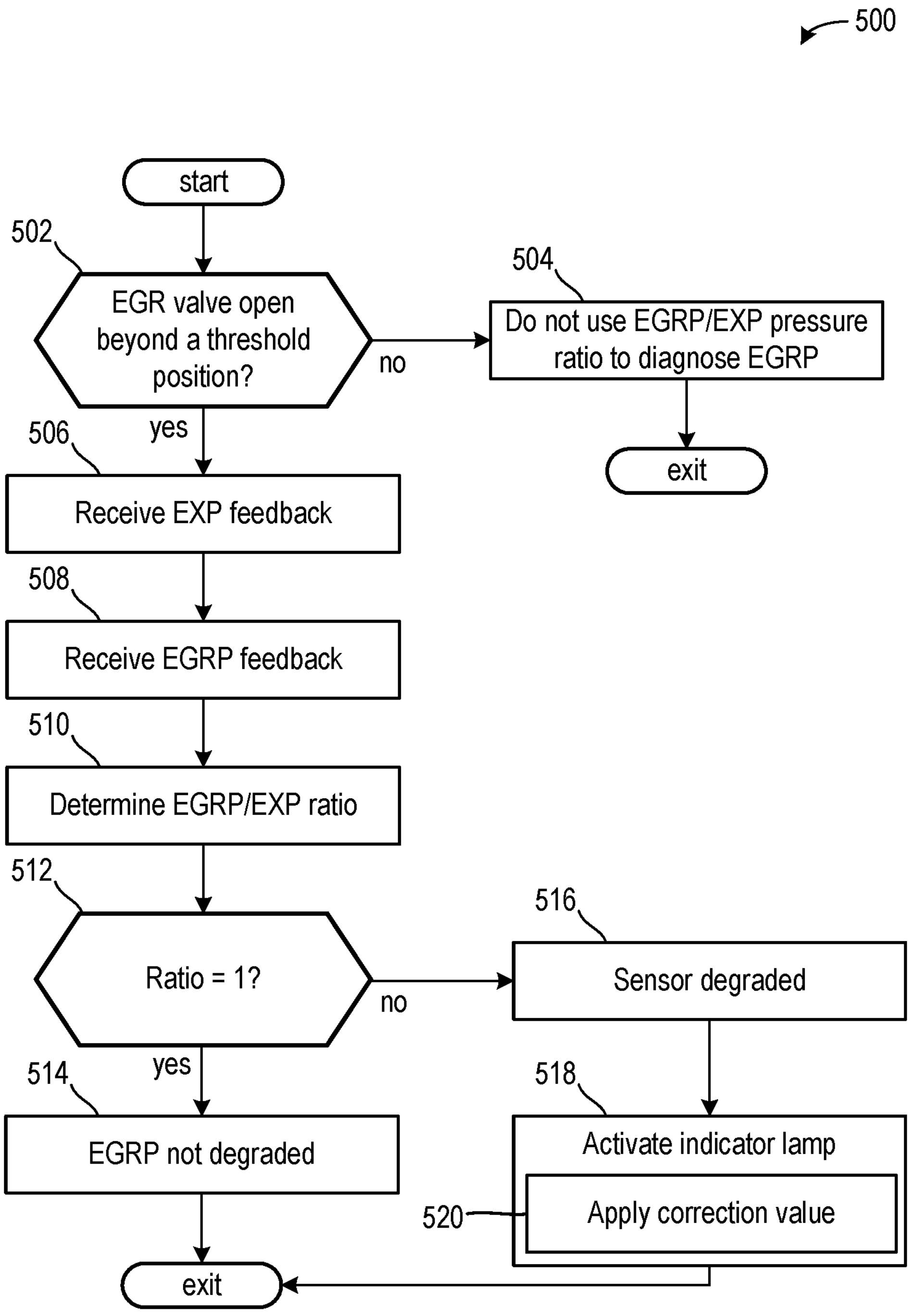
FIG. 5 illustrates a fourth routine for diagnosing an exhaust gas recirculation pressure (EGRP) sensor, according to an embodiment of the present disclosure.

Turning now to FIG. 5, it shows a method 500 for diagnosing the EGRP sensor when the EGR valve is open beyond a threshold position. The method 500 begins at 502, which includes determining if the EGR valve is open beyond a threshold position. In, one example, the threshold position may correspond to a position where the EGR valve is at least 50%, or at least 70% or at least 80%, or at least 90% open. As such, the threshold position may include where the EGR valve is closed to a fully open position rather than a fully closed position.

If the EGR valve is not open beyond the threshold position, then at 504, the method 500 may include not using the EGRP/EXP pressure ratio to diagnose the EGRP sensor. In one example, the diagnostic routine of method 400 of FIG. 4 may be used if the EGR valve is open but not open beyond the threshold position. If the EGR valve is closed, then the diagnostic routine of method 300 of FIG. 3 may be used to diagnose the EGRP.

If the EGR valve is open beyond the threshold position, then at 506, the method 500 may include receiving EXP sensor feedback. The EXP sensor may be positioned upstream of the EGR valve relative to the direction of EGR flow.

At 508, the method 500 may include receiving EGRP feedback.

At 510, the method 500 may include determining an EGRP/EXP ratio.

At 512, the method 500 may include determining if the EGRP/EXP ratio is equal to one. In some examples, additionally or alternatively, it may be determined if the EGRP/EXP ratio is within a range of 1 (e.g., within 5% of 1).

If the EGRP/EXP ratio is equal to 1, then at 514, the method 500 may include determining the EGRP sensor is not degraded. Adjustments to EGRP sensor feedback may not be initiated.

If the EGRP/EXP ratio is not equal to 1, then at 516, the method 500 may include determining the EGRP sensor is degraded.

At 518, the method 500 may include activating an indicator.

At 520, the method 500 may include applying a correction value. The correction value may be applied to the EGRP sensor reading, which may provide a more accurate estimation of EGR flow.

In this way, multiple routines may be used to diagnose an accuracy of feedback provided by the EGRP sensor. The routines may be cross-checked relative to one another to verify a diagnosis of the EGRP sensor is correct. Two or more routines may be executed to determine a validity and/or an accuracy of a condition of the EGRP sensor. By doing this, EGR mass flow may be closer to a demanded value, which may enhance engine combustion efficiency and decrease emissions.

Turning now to FIG. 6, it shows a method 600 for determining an EGR valve offset during one or more drive cycles. The method 600 further includes determining if the EGR valve offset is resulting in engine misfires.

The method 600 begins at 602, which includes determining if a keep alive memory (KAM) of the controller is being reset. In one example, when the KAM reset is active, memory stored therein may be cleared.

If the KAM reset is active, then at 604, the method 600 may include not monitoring an EGR leak through the EGR valve.

If the KAM reset is not active, then at 606, the method 600 may include determining current operating conditions. The current operating conditions may be operating conditions of a current drive cycle. The current operating conditions may include mass air flow, manifold pressure, engine load, engine speed, EGR flow rate, and air/fuel ratio.

At 608, the method 600 may include sensed a determined number of valve offset samples during a current drive cycle. The determined number of valve offset samples may be a fixed number or a dynamic number. The dynamic number may be adjusted based on the current operating conditions, EGR valve positions, and the like. For example, at least one offset sample may be sensed for each EGR valve position used during the current drive cycle. The offset may be determined based on a comparison between a requested EGR flow rate and an actual EGR flow rate. If the actual EGR flow rate is less than the requested EGR flow rate, then the EGR valve offset may be a negative value, indicating less EGR is flowing than requested. If the actual EGR flow rate is greater than the requested EGR flow rate, then the EGR valve offset may be a positive value, indicating more EGR is flowing than requested. The fixed number may be equal to one sample per EGR valve position, two samples per EGR valve position, or so on. If two samples are requested per position, one sample may be gathered at upon entering the position and another prior to exiting the position.

In one example, additionally or alternatively, the offset may be at least partially based on the cooler pressure model and/or the EGRP/EXP ratio. For example, the magnitude of offset may be based on the cooler pressure model and the EGRP/EXP ratio. For example, if the EGRP/EXP ratio is equal to 1 during a partially open position of the EGR valve, then an EGR leak may be present. The commanded EGR position may be adjusted to a more closed position to account for the EGR leak. The commanded EGR position may be adjusted until the EGRP/EXP ratio is equal to a desired value.

At 610, the method 600 may include determining if the drive cycle is complete. The drive cycle is complete if the engine is shut-off due to an ignition key being turned or an ignition button being depressed. Additionally or alternatively, if a start/stop is initiated, then the drive cycle may be complete.

If the drive cycle is not complete, then the method 600 may continue to monitor operating conditions and sense valve offset samples. If the drive cycle is complete, then at 612, the method 600 may include calculating an average offset of the drive cycle. The average offset may include the positive and negative values. Additionally or alternatively, in order to determine an average EGR leak through the EGR valve due to EGR valve position offset, the average offset may only include positive values.

At 614, the method 600 may include comparing the average offset to an historical offset average. The historical offset average may be based on an average offset of offsets gathered during previous drive cycles. The historical offset is described in more detail with regard to FIG. 7.

At 616, the method 600 may include determining if the average offset is less than or equal to the historical offset average. If the average offset is less than or equal to the historical offset average, then at 618, the method 600 may include determining that an EGR leak is not present. As such, the diagnostic may be passed. Additionally or alternatively, the historical offset average may be updated based on the average offset determined during the drive cycle of the method 600.

If the average offset is not less than or equal to the historical offset average (e.g., greater than), then at 620, the method 600 may include sensing for a misfire event. In one example, the misfire event may correspond to a time at which an EGR valve offset was sensed. Additionally or alternatively, the misfire event may occur for an EGR valve position at which an EGR valve offset was sensed. An engine misfire may include where a desired amount of combustion does not occur in at least one engine cylinder. The engine misfire may be sensed based on a cylinder pressure, a cylinder temperature, and/or a cylinder power output being less than an expected corresponding value.

At 622, the method 600 may include determining if a misfire event is present. If a misfire event is not present, then at 624, the method 600 may include not indicating an EGR leak through the EGR valve.

If a misfire event is present, then at 626, the method 600 may include indicating an EGR leak is present. In one example, at 628, the method 600 may include activating an indicator lamp. Additionally or alternatively, engine operating parameters may be adjusted to account for the EGR leak and at which position(s) the EGR valve is leaking. For example, if the EGR valve leaks when the EGR valve is commanded to a fully closed position, then adjustments may occur during only engine operating parameters when the EGR valve is commanded to be fully closed. Additionally or alternatively, if an EGR leak occurs during partially open positions of the EGR valve, then a commanded position of the EGR valve may be adjusted to account for the EGR leak. In one example, an amount of the EGR valve opening may be reduced in proportion to an amount of the EGR leak. In the fully closed position that includes an EGR leak, engine operating conditions may be adjusted, the adjustments may include increasing fueling and/or a number of fuel injections, increasing a number and/or timing of spark, and the like. Additionally or alternatively, if boost is provided, a cooler may be bypassed to maintain higher boost temperatures.

In some examples, additionally or alternatively, if the engine is a multi-fuel engine and the EGR valve is leaking, then an alternative fuel may be supplied. For example, if the multi-fuel engine is a diesel and hydrogen engine, then hydrogen and diesel may be provided to the engine during conditions where the EGR leak occurs to mitigate a likelihood of misfire.

Turning now to FIG. 7, it shows a method 700 for determining an historical EGR valve average offset. The method 700 begins at 702, which includes determining current operating conditions. The current operating conditions may be operating conditions of a current drive cycle. The current operating conditions may include mass air flow, manifold pressure, engine load, engine speed, EGR flow rate, and air/fuel ratio.

At 704, the method 700 may include monitoring a valve offset during a plurality of conditions during a drive cycle.

For example, the valve offset may be monitored during different engine loads, EGR valve positions, vehicle speeds, and the like.

At 706, the method 700 may include applying a lowpass first order filter on sensed valve offsets.

At 708, the method 700 may include storing the filtered valve offset as a learned history of offset in KAM.

At 710, the method 700 may include calculating an average history of offset for a given condition. For example, a particular engine speed and requested EGR valve position may include an average history of offset different than an average history of offset for a different engine speed and requested EGR valve position. The different engine conditions and corresponding EGR valve positions may each include an average history of offset.

At 712, the method 700 may include updating the average history of offset based on future offset values, such as values gathered during method 600 of FIG. 6. In one example, only offset values that are less than or equal to the average history of offset may be used for updating. Offset values greater than the average history of offset in conjunction with a misfire may not be used as these offset values correspond to a failed diagnostic test. In one example, if an offset value is greater than the average history of offset and a misfire is not present, the offset value may be used to update the average history of offset. Additionally or alternatively, the offset value greater than the average history of offset in the absence of the misfire may be flagged and/or marked. If future offset values are below the average history of offset then the flagged offset value may be ignored.

Turning now to FIG. 8, it shows a graph 800 graphically illustrating various conditions for determining if an EGR leak is present. Plot 810 illustrates a present average valve offset and dashed line illustrates an historical average valve offset. Plot 820 illustrates if a misfire is occurring. Plot 830 illustrates if a flag is set. Time increases from a left to a right side of the figure.

Prior to t1, multiple average valve offsets are acquired and compared to the historical average offset. More specifically, two average valve offsets are acquired across two separate drive cycles. Peaks of plot 810 represent an average valve offset value and valleys represent conditions where the drive cycle is not occurring and a valve offset is not sensed.

At t1, an average valve offset is acquired. Between t1 and t2, the average valve offset is greater than the historical average offset. However, since a misfire is not detected, then the flag is not set and the diagnostic is passed. Between t2 and t3, more average valve offsets are acquired and the historical average offset is updated. As illustrated, the historical average offset may track with the acquired average valve offsets At t3, a misfire and an average valve offset are determined. Between t3 and t4, the flag is not activated due to the average valve offset being less than the historical average offset. At t4, the drive cycle ends.

Between t4 and t5, more drive cycles occur. Thus, the historical average offset is updated based on the acquired average valve offsets.

At t5, a drive cycle begins. Between t5 and t6, the average valve offset is greater than the historical average offset in combination with a misfire being detected. At t6, the flag is activated and the drive cycle ends. After t6, the flag remains active.

The disclosure provides support for a method for operating an exhaust gas recirculation (EGR) system including applying a cooler pressure model to compute a cooler pressure drop as a function of engine operating parameters with EGR flow and diagnosing an EGR pressure (EGRP) sensor based on a comparison of an EGRP sensor reading to a manifold air pressure (MAP) sensor reading and the cooler pressure drop. A first example of the method further includes where the EGRP sensor is arranged between an EGR cooler and an EGR valve. A second example of the method, optionally including the first example, further comprising where the EGR cooler is arranged between an intake and the EGRP sensor. A third example of the method, optionally including one or more of the previous examples, further includes where the diagnosing comprises where an EGR valve is closed. A fourth example of the method, optionally including one or more of the previous examples, further includes diagnosing the EGRP sensor when the EGR valve is open based on a ratio of the EGRP sensor reading to an exhaust gas sensor reading. A fifth example of the method, optionally including one or more of the previous examples, further includes where the exhaust gas sensor is arranged upstream of the EGR valve and the EGRP sensor is arranged downstream of the EGR valve relative to a direction of EGR flow. A sixth example of the method, optionally including one or more of the previous examples, further includes determining the EGRP sensor is degraded in response to the EGRP sensor reading being different than a sum of the MAP sensor reading and the cooler pressure drop.

The disclosure provides additional support for a system including an exhaust gas recirculation (EGR) system comprising an EGR valve upstream of an EGR cooler relative to a direction of EGR flow through the EGR system to an intake system, an exhaust gas sensor upstream of the EGR valve, and an EGR pressure (EGRP) sensor between the EGR valve and the EGR cooler, and a controller comprising computer-readable instructions stored on memory thereof that when executed enable the controller to diagnose a condition of the EGRP sensor based on a sum of a cooler pressure drop and a manifold air pressure (MAP) sensor reading compared to an EGRP sensor reading via a first routine, diagnose the condition of the EGRP sensor based on a comparison of the MAP sensor reading to the EGRP sensor reading via a second routine when the EGR valve is closed, diagnose the condition of the EGRP sensor based on the comparison of the MAP sensor reading to the EGRP sensor reading via a third routine when the EGR valve is open, and diagnose the condition of the EGRP sensor based on a ratio of the EGRP sensor reading and an exhaust gas sensor reading via a fourth routine when the EGR valve is open beyond a threshold position. A first example of the system further includes where the instructions further enable the controller to determine a correction value in response to a diagnosis indicating the EGRP sensor is degraded. A second example of the system, optionally including the first example, further includes where the instructions further enable the controller to map the cooler pressure drop across a plurality of operating points of an engine coupled to the intake system. A third example of the system, optionally including one or more of the previous examples, further includes where the instructions further enable the controller to determine the EGRP sensor is degraded during the first routine in response to the EGRP sensor reading between different than the sum of the MAP sensor reading and the cooler pressure drop. A fourth example of the system, optionally including one or more of the previous examples, further includes where the instructions further enable the controller to determine the EGRP sensor is degraded during the second routine in response to the EGRP sensor reading being different than the MAP sensor reading. A fifth example of the system, optionally including one or more of the previous examples, further includes where the instructions further enable the controller to determine the EGRP sensor is degraded during the third routine in response to the EGRP sensor reading being different than the MAP sensor reading by a calibrated value, wherein the calibrated value is based on a quadratic curve. A sixth example of the system, optionally including one or more of the previous examples, further includes where the instructions further enable the controller to determine the EGRP sensor is degraded during the fourth routine in response to the ratio deviating from a value of 1. A seventh example of the system, optionally including one or more of the previous examples, further includes where the instructions further enable the controller to validate a diagnosis of the EGRP sensor by executing two or more of the first, second, third, and fourth routines.

The disclosure provides further support for a method for an exhaust gas recirculation (EGR) system of a vehicle including mapping a cooler pressure drop at a plurality of operating conditions of the vehicle and determining a degradation of an EGR pressure (EGRP) sensor based on a comparison of an EGRP sensor reading to a sum of a manifold air pressure (MAP) sensor reading and the cooler pressure drop. A first example of the method further includes indicating no degradation to the EGRP sensor in response to the EGRP sensor reading being equal to the sum of the MAP sensor reading and the cooler pressure drop. A second example of the method, optionally including the first example, further includes indicating degradation of the EGRP sensor in response to the EGRP sensor reading being different than the sum of the MAP sensor reading and the cooler pressure drop. A third example of the method, optionally including one or more of the previous examples, further includes verifying the degradation of the EGRP sensor by comparing the EGRP sensor reading to only the MAP sensor reading when an EGR valve is fully closed. A fourth example of the method, optionally including one or more of the previous examples, further includes verifying the degradation of the EGRP sensor by comparing a ratio of the EGRP sensor reading to an exhaust gas pressure sensor reading to one.

The disclosure provides support for a method including determining an exhaust gas recirculation (EGR) leak is present based on a comparison of a present valve average offset to an historical EGR valve average offset. A first example of the method further includes determining the EGR leak is present based on a presence of an engine misfire. A second example of the method, optionally including the first example, further includes where the EGR leak is present in response to the present valve average offset being greater than the historical EGR valve average offset. A third example of the method, optionally including one or more of the previous examples, further includes where determining the EGR leak is present is not executed when a keep alive memory of a controller is actively being reset. A fourth example of the method, optionally including one or more of the previous examples, further includes where the EGR leak is absent in response to the present valve average offset being less than or equal to the historical EGR valve average offset. A fifth example of the method, optionally including one or more of the previous examples, further includes where updating the historical EGR valve average offset based on the present valve average offset. A sixth example of the method, optionally including one or more of the previous examples, further includes where the present valve average offset is based on a difference in demanded EGR flow rate and actual EGR flow rate. A seventh example of the method, optionally including one or more of the previous examples, further includes where the present valve average offset is based on an EGR pressure sensor (EGRP)/exhaust gas pressure sensor (EXP) ratio.

The disclosure provides additional support for a system including an exhaust gas recirculation (EGR) system comprising an EGR valve upstream of an EGR cooler relative to a direction of EGR flow through the EGR system to an intake system, an exhaust gas sensor upstream of the EGR valve, and an EGR pressure (EGRP) sensor between the EGR valve and the EGR cooler, and a controller comprising computer-readable instructions stored on memory thereof that when executed enable the controller to sense a plurality of EGR valve offsets during a plurality of drive cycles, determine an average historical EGR valve offset based on previous EGR valve offsets sensed during a plurality of previous drive cycles, determine a present EGR valve average offset during a present drive cycle, compare the present EGR valve average offset to the average historical EGR valve offset, and determine an EGR leak in response to the present EGR valve average offset being greater than the average historical EGR valve offset in combination with an engine misfire being detected. A first example of the system further includes where the average historical EGR valve offset is one of a plurality of average historical EGR valve offsets, wherein each of the plurality of average historical EGR valve offsets is based on operating parameters of a previous drive cycle of the plurality of previous drive cycles. A second example of the system, optionally including the first example, further includes where the present EGR valve average offset is determined based on an EGR cooler pressure model. A third example of the system, optionally including one or more of the previous examples, further includes where the instructions further cause the controller to adjust engine operating parameters in response to the EGR leak being present when the EGR valve is commanded to a closed position. A fourth example of the system, optionally including one or more of the previous examples, further includes where the instructions further cause the controller to adjust an EGR valve position in response to the EGR leak being present when the EGR valve is in an at least partially open position. A fifth example of the system, optionally including one or more of the previous examples, further includes where the instructions further cause the controller to determine the EGR leak is not present in response to the present EGR valve offset being less than or equal to the average historical EGR valve offset. A sixth example of the system, optionally including one or more of the previous examples, further includes where the instructions further cause the controller to determine the EGR leak is not present in response to the engine misfire not being present.

The disclosure provides further support for a method for an exhaust gas recirculation (EGR) system, the method including calculating an historical average offset of an EGR valve during a plurality of previous drive cycles, an offset based on a difference between a commanded position and an actual position of the EGR valve, determining a present average offset of the EGR valve during a present drive cycle, monitoring a presence of an engine misfire, and indicating an EGR leak is present in response to the presence of the engine misfire in combination with the present average offset being greater than the historical average offset. A first example of the method further includes where the offset is further based on one or more of a cooler pressure drop model and a ratio of EGR pressure/exhaust gas pressure. A second example of the method, optionally including the first example, further includes where the EGR pressure is sensed downstream of the EGR valve and the exhaust gas pressure is sensed upstream of the EGR valve relative to a direction of exhaust gas flow. A third example of the method, optionally including one or more of the previous examples, further includes where adjusting operating conditions in response to indicating the EGR leak is present, wherein the adjusting comprising adjusting one or more of a commanded position of the EGR valve, adjusting an amount of fuel delivered to an engine, adjusting a spark timing, adjusting a fuel injection timing, adjusting a boost air routing, and adjusting a mass air flow. A fourth example of the method, optionally including one or more of the previous examples, further includes where the historical average offset is updated based on the present average offset.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

calculating a historical exhaust gas recirculation (EGR) valve average offset based on data from previous drive cycles;

sensing, via sensors of an engine control system, operating conditions during a current drive cycle;

calculating a present valve average offset based on the operating conditions;

comparing the present valve average offset to the historical EGR valve average offset;

monitoring an EGR leak, wherein monitoring the EGR leak comprises determining the EGR leak is not present when the present valve average offset is less than or equal to the historical EGR valve average offset.

2. The method of claim 1, further comprising determining the EGR leak is present based on a presence of an engine misfire.

3. The method of claim 2, wherein the EGR leak is present in response to the present valve average offset being greater than the historical EGR valve average offset.

4. The method of claim 1, wherein monitoring the EGR leak is not executed when a keep alive memory of a controller is actively being reset.

5. The method of claim 1, further comprising updating the historical EGR valve average offset based on the present valve average offset.

6. The method of claim 1, wherein the present valve average offset is based on a difference in demanded EGR flow rate and actual EGR flow rate.

7. The method of claim 1, wherein the sensors of the engine control system include an EGR pressure sensor (EGRP) and an exhaust gas pressure sensor (EXP), and wherein the present valve average offset is based on an EGRP/EXP ratio.

8. The method of claim 1, further comprising determining an EGR leak is present and, in response, activating an indicator lamp.

9. A system, comprising:

an exhaust gas recirculation (EGR) system comprising an EGR valve upstream of an EGR cooler relative to a direction of EGR flow through the EGR system to an intake system, an exhaust gas sensor upstream of the EGR valve, and an EGR pressure (EGRP) sensor between the EGR valve and the EGR cooler; and a controller comprising computer-readable instructions stored on memory thereof that when executed enable the controller to:

sense a plurality of EGR valve offsets during a plurality of drive cycles;

determine an average historical EGR valve offset based on previous EGR valve offsets sensed during a plurality of previous drive cycles;

determine a present EGR valve average offset during a present drive cycle;

compare the present EGR valve average offset to the average historical EGR valve offset;

determine an EGR leak in response to the present EGR valve average offset being greater than the average historical EGR valve offset in combination with an engine misfire being detected; and adjust engine operating parameters in response to the EGR leak being present.

10. The system of claim 9, wherein the average historical EGR valve offset is one of a plurality of average historical EGR valve offsets, and wherein each of the plurality of average historical EGR valve offsets is based on operating parameters of a previous drive cycle of the plurality of previous drive cycles.

11. The system of claim 9, wherein the present EGR valve average offset is determined based on an EGR cooler pressure model.

12. The system of claim 9, wherein the instructions further cause the controller to adjust engine operating parameters in response to the EGR leak being present when the EGR valve is commanded to a closed position.

13. The system of claim 9, wherein the instructions further cause the controller to adjust an EGR valve position in response to the EGR leak being present when the EGR valve is in an at least partially open position.

14. The system of claim 9, wherein the instructions further cause the controller to determine the EGR leak is not present in response to the present EGR valve offset being less than or equal to the average historical EGR valve offset.

15. The system of claim 9, wherein the instructions further cause the controller to determine the EGR leak is not present in response to the engine misfire not being present.

16. A method for an exhaust gas recirculation (EGR) system, the method comprising:

calculating an historical average offset of an EGR valve during a plurality of previous drive cycles, an offset based on a difference between a commanded position and an actual position of the EGR valve;

determining a present average offset of the EGR valve during a present drive cycle;

monitoring a presence of an engine misfire;

indicating an EGR leak is present in response to the presence of the engine misfire in combination with the present average offset being greater than the historical average offset; and adjusting operating conditions in response to indicating the EGR leak is present.

17. The method of claim 16, wherein the offset is further based on one or more of a cooler pressure drop model and a ratio of EGR pressure/exhaust gas pressure.

18. The method of claim 17, wherein the EGR pressure is sensed downstream of the EGR valve and the exhaust gas pressure is sensed upstream of the EGR valve relative to a direction of exhaust gas flow.

19. The method of claim 16, wherein adjusting the operating conditions comprises adjusting one or more of a commanded position of the EGR valve, adjusting an amount of fuel delivered to an engine, adjusting a spark timing, adjusting a fuel injection timing, adjusting a boost air routing, and adjusting a mass air flow.

20. The method of claim 16, wherein the historical average offset is updated based on the present average offset.

* * * * *